United States Patent [19]
Lewis et al.

[11] Patent Number: 5,986,261
[45] Date of Patent: Nov. 16, 1999

[54] TAPERED STRUCTURE SUITABLE FOR MICROTHERMOCOUPLES MICROELECTRODES, FIELD EMISSION TIPS AND MICROMAGNETIC SENSORS WITH FORCE SENSING CAPABILITIES

[75] Inventors: Aaron Lewis; Galina Fish, both of Jerusalem; Sofia Kokotov, Maale Adumin; Klony Lieberman, Jerusalem, all of Israel

[73] Assignee: Nanoptics, Inc., Jerusalem, Israel

[21] Appl. No.: 08/945,409

[22] PCT Filed: Apr. 29, 1996

[86] PCT No.: PCT/US96/05655
§ 371 Date: Oct. 29, 1997
§ 102(e) Date: Oct. 29, 1997

[87] PCT Pub. No.: WO96/35225
PCT Pub. Date: Nov. 7, 1996

[30] Foreign Application Priority Data

Apr. 30, 1996 [IL] Israel ......................................... 113551

[51] Int. Cl.[6] .................................................. H01J 37/256
[52] U.S. Cl. .............................. 250/306; 136/228; 374/6; 374/124; 374/164
[58] Field of Search .......................... 250/306; 136/228; 374/6, 124, 164

[56] References Cited

U.S. PATENT DOCUMENTS

| | | | |
|---|---|---|---|
| 3,819,420 | 6/1974 | Schmidt et al. | 136/228 |
| 4,747,698 | 5/1988 | Wickramasinghe et al. | 374/6 |
| 5,166,520 | 11/1992 | Prater et al. | 250/306 |

Primary Examiner—Jack I. Berman
Attorney, Agent, or Firm—Jones, Tullar & Cooper

[57] ABSTRACT

A tapered, nonconductive structure (10) having a hollow core (18) and a conical tip (14) includes a metal wire (16) within the core (18). The wire (16) is sealed within, and is exposed at the end (22) of, the tip (14). An electrically conductive or semiconductive layer (24) on the exterior of the tip (14) form a point thermocouple contact with the wire. The tip (14) may be fabricated, for example, by placing a metal wire (16) within a tube (12), and heating and pulling the tube (12) to produce two tapered micropipettes. Thereafter, a thin metal or semiconductor film (24) is evaporated onto the outer surface.

30 Claims, 1 Drawing Sheet

TAPERED STRUCTURE SUITABLE FOR MICROTHERMOCOUPLES MICROELECTRODES, FIELD EMISSION TIPS AND MICROMAGNETIC SENSORS WITH FORCE SENSING CAPABILITIES

FIELD OF THE INVENTION

The present invention relates, in general, to the fabrication of straight and bent microelectrodes, microthermocouples, micromagnetic and field emission tips for the measurement of spatially localized rapid temperature changes, electrochemistry and micromagnetic inhomogeneities and the production of directed electron beams, and to the structure of such tips. The disclosed methodology and structure have a wide variety of uses, and allow for the interface of the device of the invention with all current scanned probe microscopes.

BACKGROUND OF THE INVENTION

The measurements of spatially localized rapid temperature changes are required in studies of many physical and biological processes and objects. These can include such diverse subjects as turbulent flows, changes associated with processes of explosion and combustion, microtemperature measurements in biology at the cellular and subcellular level and microtemperature measurements in evolving chemical reactions. For all these applications a microthermocouple is the most convenient detector.

In recent publications, fast microthermocouples have been described with response times of milliseconds and spatial resolutions of from hundreds [L. J. Forney, E. L. Meeks, J. Ma, and G. C. Fralick, Rev.Sci.Instrum. 64, 1280 (1993)] to tens [P. Beckman, R. P. Roy, K. Whitfield, and A. Hasan, Rev.Sci.Instrum. 64, 2947 (1993)] of micrometers. Such microthermocouples may also be used as point radiation microdetectors in a range of wavelengths from the UW to the IR.

In addition to the above Pendley and Abruna [B. D. Pendley and H. Dl Abruña, Anal. Chem. 62, 782 (1990)] have considered the problem of microelectrodes for microchemical measurements and achieved outer diameters of a few microns under non-reproducible conditions. In addition, micromagnetic measurements are made using magnetic wires that are electropolished in which it is difficult to construct such tips [K. Sueoka, F. Sai, K. Parker and J. Arnolddussen, J. Vac.Sci. and Tech. B12, 1618 (1994)]. Furthermore, there is great interest in making microtip field emission tips [C. A. Spindt, et al. J. Appl.Phys. 47, 5248 (1976)] but there is an active interest in new methodologies for making such tips with better characteristics.

STATE OF PRIOR ART

No devices or methodologies have been reported that can provide thermal or electrochemical measurements in isolated submicrometer size volumes or in macrovolumes with submicrometer spatial resolution. In addition, the response time of such measurements are on the order of milliseconds and no shorter response times are known.

Recent publications, as noted above, have described response times of milliseconds with spatial resolutions from hundreds of micrometers. In addition, some recent publications have described thermal imaging using atomic force microscopy (AFM) without specific measurements of the time response of these devices [A. Majumdar, J. P. Carrejo and J. Lai, Appl. Phys. Lett. 62, 2501 (1993)]. The thermocouples that have been used in AFM employed a 2-wire thermocouple junction of $25\mu$ diameter which ended in a sharp tip suitable for AFM. The two wire thermocouples that were fabricated acted as a thermal bridge in the measurements, distorting the real thermal picture of the sample. These thermocouples reflected only the relative thermal character of the samples and did not give an absolute thermal measure of the temperature.

In addition to the above, various attempts have been made to obtain microelectrodes for micro-electrochemical measurements. The most successful of these approaches was by Abruna [B. D. Pendley and H. D. Abruña, Anal. Chem 62, 782–784 (1990)]. However, the technology employed was uncontrolled in the fabrication of these electrochemical probes, and limited the dimensionality of the probes. Furthermore, it did not allow for the interfacing of these electrodes with normal force sensing scanned probe microscopes.

Furthermore, micromagnetic measurements have only been performed with magnetic wires and these are notoriously difficult to fabricate. Finally, field emission tips produced today by a variety of procedures unrelated to the present invention have less than ideal characteristics.

SUMMARY OF THE INVENTION

The present invention provides a new technique for microtemperature measurements with thermocouples that have a submicrometer contact size and a response time of a few microseconds. The technique is also applicable to microchemical measurements and micromagnetic measurements and is capable of being interfaced transparently with a normal force sensing scanned probe microscope. The technology is also extendable into the realm of making unique field emission tips.

The invention develops a new tip for such microelectrochemical and fast microthermocouple measurements, including those connected with the detection of light and light induced heating effects, providing a tip that can be interfaced with atomic force microscopy. In addition, with the appropriate materials, the devices are applicable to micromagnetic measurements. The techniques developed also are applicable to microfield emission devices and yield such devices with improved characteristics.

The device of the invention consists, in one embodiment, of a tapered, nonconductive structure such as a glass or quartz micropipette having a conical tip. A metal wire is sealed within the micropipette and extends to, and is exposed at, the end of the tip. The conical tip is coated with an electrically conductive or semiconductive layer that forms a point thermocouple contact with the metal wire. The outer diameter of the tip is a few nanometers, with the diameter of the wire being ½ to ⅓ the outer diameter of the tip.

The tip is fabricated by placing a metal wire within a tube of borosilicate, for example, and the tube is heated and pulled to produce two tapered micropipettes. Thereafter, a thin metal or semiconductor film is evaporated onto the outer surface of the tip, with the rate and time of deposition being controlled to produce the desired thickness.

BRIEF DESCRIPTION OF DRAWINGS

The foregoing, and additional objects, features and advantages of the invention will be understood by those of skill in the art upon consideration of the following detailed description of preferred embodiments thereof, taken with the accompanying drawings, in which.

DESCRIPTION OF THE INVENTION

Figure 1:
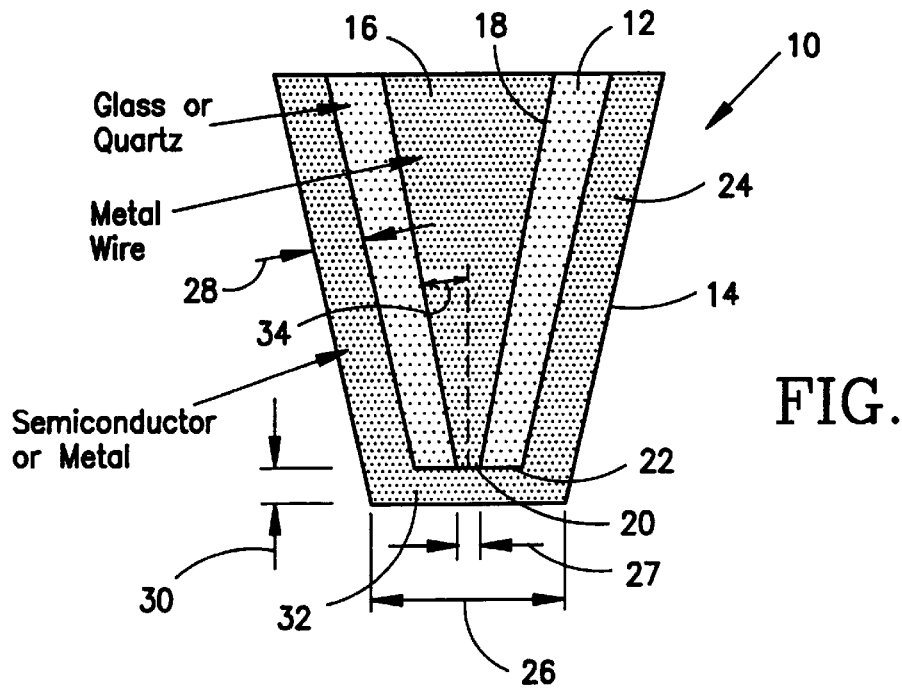
FIG. 1 is a diagrammatic cross-sectional view of a curved micropipette fabricated in accordance with the present invention.

The invention represents a method and a device for the production of microthermocouples for the measurement of temperature with resolutions that can be as good as submicron with response times that can be as good as microseconds. The fabrication procedures result also in microelectrochemical devices that can have submicron resolution. All of the devices described herein can be effectively integrated into conventional scanned probe microscopes.

The device of the present invention is a hollow micropipette 10 constructed of glass or quartz or other nonconducting material 12. The micropipette tapers inwardly along its length to form a conical tip 14, FIG. 1. The conical nonconductor has sealed in it a metal core, such as a wire 16 that extends through a hollow center 18 of the micropipette, with the terminal end 20 of the wire being coextensive with the terminal end 22 of the conical tip portion 14 of the micropipette 10. The metal wire is electrically conductive and is exposed at the micropipette tip to contact a metal or semiconductor layer 24 which coats the entire tip 14. The layer 24 forms a point thermocouple contact with the exposed end 20 of the metal wire at the tip.

This tip 14 can be a straight structure or it can be part of a bent glass micropipette (see FIG. 2), for the addition of normal force sensing. The outer diameter 26 of tip 14 can be as small as a few nanometers at the tip end 22, with the diameter 27 of the wire 16 inside being smaller by approximately 2–3 times.

For temperature measurements, the inner wire and the outer coating are connected to a voltmeter (not shown). For temperature measurements wherein the structure is not distorted by heat transfer through the wire core 16, the outside coating 24 surrounding the pipette 12 should have a thickness 28 of at least an order of magnitude less than the thickness of the coating 30 at the end 32 of the tip 14 when the coating is for metal. When the outer coating is a semiconductor this requirement is not important because of the low thermal conductivity of the semiconductor.

Figure 2:
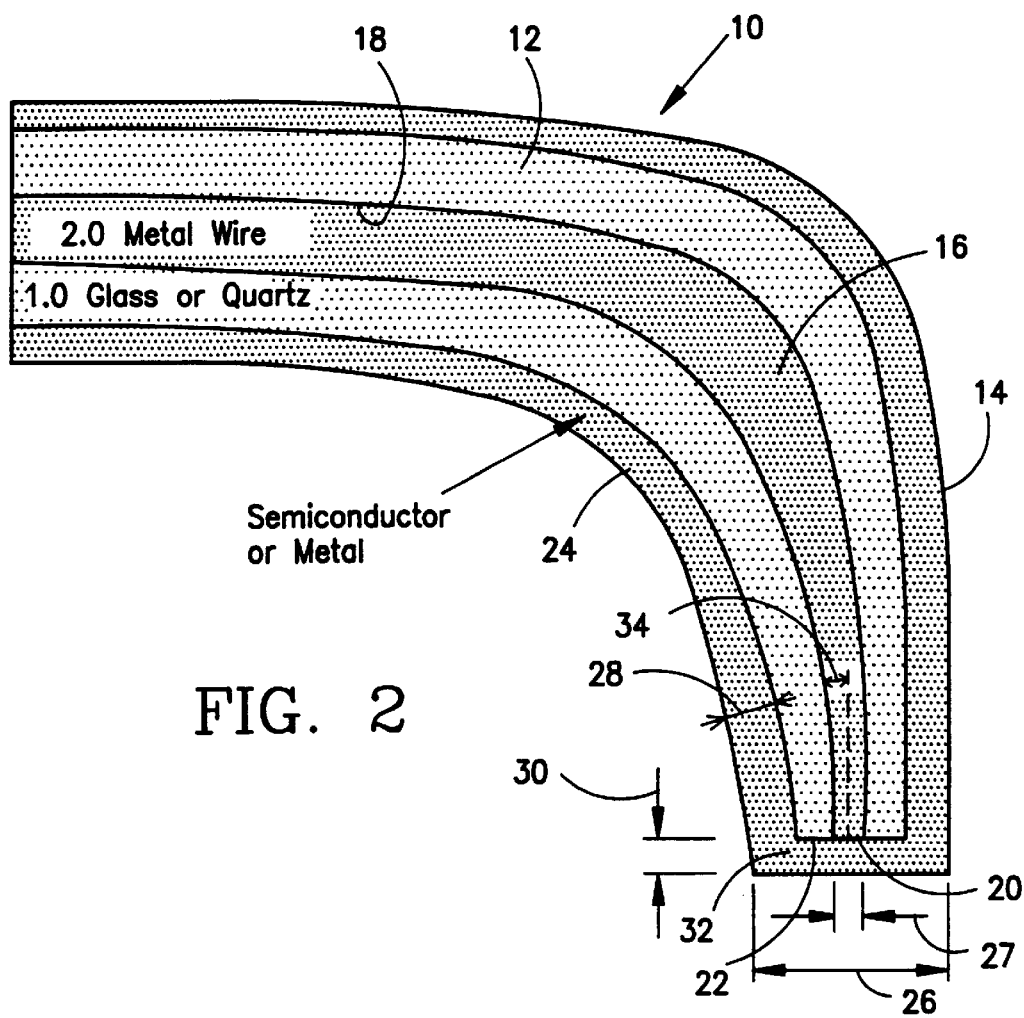
FIG. 2 is an enlarged cross-sectional view of a micropipette tip for use as an extension to a conventional force sensing cantilever.

As illustrated in both FIG. 1 and FIG. 2, the wire 16 is generally conical in shape at its end portion, with the diameter tapering inwardly to its smallest size at its terminal end 20. The angle of taper, or the cone angle 34 of the wire near the end of the tip must be at least three times less than the ratio of the thermal conductivity of the medium times the outer diameter 26 of the tip to the thermal conductivity of the inner wire material 16 times the diameter of this wire.

For microelectrode production the coating 32 on the front face of the tip can be eliminated, while for microchemical measurements both this coating 32 and the outer coating 24, can be eliminated. For field emission tips it may be necessary to etch the inner wire 16 either to expose it or to recess it in the glass tip.

For micromagnetic measurements the metal wire 16 has to be composed of a magnetic material while the coating 24 has to be composed of a non-magnetic metal for shielding.

The technique for the production of these microelectrodes, field emission tips and microthermocouples involves placing a metal wire, from 50–100 micrometers in diameter, inside a borosilicate tube with outer and inner diameters equal to 1.2 and 0.3 mm, respectively. This tube-wire assembly is placed in a tube pulling device (not shown) which allows the variation of 5 parameters: temperature of heating, the length of the segment heated, delay time between turning the heat on and the beginning of pulling, the velocity of the pull and the strength of the pulling. Such a device can generate the tip shown in FIG. 1.

To produce the required structure a pulling operation is performed in the following 2 steps:

First, the two ends of the glass tube and wire assembly are secured in the pulling device and the glass tube is pulled (or stretched) to reduce its diameter. In this first step, the tube is pulled until its inner diameter 18 is equal to the inner wire diameter. At this point the tube is heated for several seconds without further pulling to ensure a firm connection between the glass and the inner metal wire. Thereafter, the pulling is continued slowly, in 4 stages, resulting in the formation of two tapered glass-pipettes that are filled with metal to the end. The shape of the pipette and wire cones and their diameters are determined by the five pulling parameters noted above, with the wire core within the pipette reaching a diameter in the nanometer range.

This first step in the process is sufficient for producing microelectrodes. For field emission tips a second etching step is sometimes necessary in order to either recess or to expose the inner metal wire.

Subsequently, a second thermoelectrode is made as a vacuum-evaporated thin metal or semiconductor film 24. The deposition procedure controls the thickness of the film in various regions. Edge-like coatings with a maximal thickness of the coated layer near the tip can be produced to fulfill the conditions described above. Varying the rate and time of deposition provides coatings with the required thickness and electrical conductance [M. Adamov, B. Perovic, and T. Nenadovic, Thin Solid Films. 24, 89 (1974)] to improve the spatial resolution of the thermocouples.

An alternate method to deposit the inner metal wire is a non-electrochemical method of metallic deposition such as self-assembly of metal colloids on the inside glass or quartz surface 18 of the pipette 12 using technologies that have been described for such depositions on regular glass surfaces [R. G. Freeman et al Science 267, 1629 (1995)]. Similar procedures could be employed to coat the outside of the nonconducting structure and then this could be coupled with known electrochemical deposition techniques to eliminate some of the subsequent deposition steps in producing these structures. In essence this could, in principle, simplify the depositions required for achieving the devices described above.

Finally, to fabricate micromagnetic probes using this procedure, either of the above two techniques for deposition of a metallic wire inside is feasible. Thus, this can be done by the pulling technology or the chemical methods noted above.

All of the above straight structures can be produced with the type of control that permits the resonance frequency of the structure to be controlled to the point of permitting these straight structures to be used for monitoring lateral forces of surfaces. For such measurements with these straight structures, modulations of the conical tip will have to be imposed and the amplitude and the frequency of such modulations will change when the tip approaches the surface.

For force measurements normal to a surface, the region above the sensing tip in the pipette like structure has to be bent. The method of micropipette bending is as follows. The micropipette is placed under a lens of a microscope in such a way that a section of it that is a few tens of micrometers distant from the tip is heated with a heat source such as a carbon dioxide laser also focused through a lens. As a result of this heating the micropipette begins to soften in the irradiated region and this section of the micropipette eventually bends. The angle of bend can be controlled, and may approach, or even exceed, the 90° bend illustrated in FIG. 2. This procedure allows for fine control of the angle of bending and length of the resulting tip.

In distinction from the known wire thermocouples, the proposed construction allows creation of a submicron dimension microelectrode, field emission tip, micromagnetic tip, and a tip with a thermoelectric contact. The spatial resolution that can be achieved can be as small as nanometers. Surface temperatures can be measured using the bent structure shown in FIG. 2. Calculations and experiments show that the response time of the thermocouple with a tip diameter 26 of less than 1 micron is about 1 microsecond. The method of fabrication of these microthermocouples, microelectrodes and micromagnetic tips provides a high degree of control of the wire and glass diameter in the conical part of the tip, the cone angle of the conical structure, the resonant frequency of the structure for its application to simultaneous force measurements, etc.

A variety of applications with these devices and this technology is now possible. These include microthermal measurements, for example in microcircuits that are functioning, while simultaneously recording their topography with the force sensing capabilities of the tips. Micromagnetic measurements and combined micromagnetic, thermal and topographic measurements can also be made. New and improved field emission tips for such areas as electron microscope are also provided, as are electrochemical measurements with microelectrodes that have high spatial resolution and the capability of simultaneously monitoring topography with the force sensing capability of the tips.

Although the invention has been described in terms of preferred embodiments, variations and modifications will be apparent to those of skill in the art.

What is claimed is:

1. An assembly, comprising:
   an electrically nonconductive tube having a conical tip portion incorporating an inwardly tapering outer surface;
   a tapered electrically conductive inner core within said tube, said inner core having a terminal end coextensive with said tube and tapering to a submicron diameter at an end portion thereof; and
   a conductive or semiconductive coating on the outer surface of said tip portion of said tube and surrounding the end portion of said inner core, wherein the inwardly tapering outer surface of the inner core near a terminal end of the conical tip portion has a cone angle at least three times less than the ratio of the thermal conductivity of said coating times the outer diameter of the conical tip portion to the thermal conductivity of the material of said inner core times the diameter of the inner core.

2. The assembly of claim 1, wherein said tube includes a linear portion terminating in said tip portion, said tip extending from the linear portion with an angle that can approach ninety degrees, resulting in a tapered structure with a bend leading to the conical tip.

3. The assembly of claim 1, wherein said core is metal wire.

4. The assembly of claim 1, wherein said tapered nonconductive tube is a silicon insulating material.

5. The assembly of claim 1, wherein an applied voltage between said core and said coating produce a point heat source at the end portion of said core.

6. The assembly of claim 1, wherein said tube is a micropipette.

7. An assembly, comprising:
   an electrically nonconductive tube having a conical tip portion incorporating an inwardly tapering outer surface which tapers to an outer submicron diameter;
   a tapered metal inner core within said tube, said core having a terminal end coextensive with said tube, said core tapering to an outer diameter of ½ to ⅓ the outer diameter of said tip;
   a conductive or semiconductive coating on the outer surface of said tip portion of said tube and surrounding the end portion of said metal core; and
   wherein said assembly has a resonant frequency selected for use in force sensing.

8. The assembly as in claim 7, wherein the inwardly tapering outer surface of the inner core near the end of the tip has a cone angle at least three times less than the ratio of the thermal conductivity of said coating times the outer diameter of the tip to the thermal conductivity of the material of said inner core times the diameter of the inner core.

9. An assembly comprising:
   an electrically nonconductive tube having a conical tip portion incorporating an inwardly tapering outer surface which tapers to an outer submicron diameter;
   a tapered electrically conductive inner core within said tube, said core having a terminal end coextensive with said tube, said inner core tapering to an outer diameter of ½ to ⅓ the outer diameter of said conical tip portion; and
   wherein said assembly has a resonant frequency selected for normal and lateral force sensing.

10. An assembly, comprising:
    an electrically nonconductive tube having a conical tip portion incorporating an inwardly tapering outer surface;
    a tapered electrically conductive inner core within said tube, said inner core having a terminal end coextensive with said tube, and tapering to a submicron diameter at an end portion thereof;
    a conductive or semiconductive coating on the outer surface of said tip portion of said tube and surrounding the end portion of said inner core; and
    said metal inner core having a cone angle near the end of the conical tip portion which is at least three times less than the ratio of the thermal conductivity of the coating times the outer diameter of the conical tip portion to the thermal conductivity of the inner core times the diameter of the inner core.

11. An assembly, comprising
    an electrically nonconductive tube having a conical tip portion incorporating an inwardly tapering outer surface wherein said nonconductive tube is a nonconducting glass having an inner surface surrounding a hollow core;
    a tapered electrically conductive inner core within said hollow core of said tube, said inner core having an end portion coextensive with said conical tip portion and having an outer surface diameter tapering inwardly to a diameter in the submicron range at a terminal end thereof; and the hollow core of said nonconductive tube having an internal diameter substantially equal to the diameter of the outer surface of the inner core with said inner surface of said tube being sealed to said outer surface of said inner core, the assembly being usable as a microelectrode for electrochemical and other measurements and as a field emission source.

12. The assembly of claim 11, wherein said conical tube includes a linear portion terminating in said tip portion, said tip portion extending from the linear portion at an angle that can approach ninety degrees, resulting in a tapered structure with a bend leading to the conical tip portion.

13. The assembly of claim 11, wherein said tube and inner core have resonant frequencies selected for use in lateral force sensing.

14. The assembly as in claim 11, wherein said tube and inner core have resonant frequencies selected for use in normal and lateral force sensing.

15. The assembly of claim 11, in which the inner core in the tip of the conical structure is a magnetic material.

16. The assembly of claim 15, wherein said tube includes a linear portion terminating in said tip portion, said tip portion extending from said linear portion at an angle that can approach ninety degrees, resulting in a tapered structure with a bend leading to the conical tip portion.

17. The assembly of claim 15, wherein said tube and inner core have resonant frequencies selected for use in force sensing.

18. The assembly of claim 16, wherein said tube and inner core have resonant frequencies selected for use in normal and lateral force sensing.

19. The assembly of claim 11, in which the internal inner core in the tip of the conical structure is a magnetic material and the surrounding glass tube is coated with a metallic material.

20. The assembly of claim 19, wherein said conical tip portion extends from a linear portion of said tube at an angle that can approach ninety degrees to produce a tapered structure with a bend leading to the conical tip.

21. The assembly of claim 20, wherein said tube and said inner core have resonant frequencies selected for use in force sensing.

22. The assembly of claim 20, wherein said tube and said inner core have resonant frequencies selected for use in normal and lateral force sensing schemes.

23. The assembly of claim 11, wherein said inner core is an internal metal wire and the surrounding nonconductive structure is coated with a metallic material.

24. The assembly of claim 21, wherein the conical tip portion extends from a linear portion of said tube at an angle that can approach ninety degrees to produce a tapered structure with a bend leading to the conical tip.

25. The assembly of claim 24, wherein said inner tube and said core have resonant frequencies selected for use in force sensing.

26. The assembly of claim 24, wherein said tube and said core have resonant frequencies selected for use in normal and lateral force sensing.

27. The assembly of claim 23, wherein the internal metal wire in the tip of the conical structure is a magnetic material and the surrounding glass structure including the terminal end thereof is coated with another metallic material which makes a point contact with the terminal end of the magnetic material to permit simultaneous micromagnetic and microthermal measurements.

28. The assembly of claim 27, wherein the conical tip portion extends from a linear portion of said tube with an angle that can approach ninety degrees to produce a tapered structure with a bend leading to the conical tip.

29. The assembly of claim 27, wherein the device has resonant frequencies selected to permit the device to be used in force sensing.

30. The assembly of claim 28, wherein the device has resonant frequencies selected to permit it to be used in normal and lateral force sensing.

* * * * *